UNITED STATES PATENT OFFICE.

FRANK V. POOL, OF NEWARK, NEW JERSEY.

ART OF MANUFACTURING NITRO-CELLULOSE.

SPECIFICATION forming part of Letters Patent No. 336,822, dated February 23, 1886.

Application filed August 25, 1885. Serial No. 175,323. (No specimens.)

*To all whom it may concern:*

Be it known that I, FRANK V. POOL, a citizen of the United States, and a resident of Newark, in the county of Essex and State of New Jersey, have invented certain new and useful Improvements in the Art of Manufacturing Nitro-Cellulose, of which the following is a specification.

The invention relates to the art of manufacturing what is known as "soluble nitro-cellulose," and especially to an improved process of using nitrates in effecting the restoration of the spent acids.

The process has for its object particularly the removal of the by-product which is formed by the action of the sulphuric acid upon the nitrate. I have discovered that the crystallization of this by-product may be effected and the crystallized parts of the compound separated, the liquid being the part that is used in the conversion of the fiber.

The process of making soluble nitro-cellulose as at present conducted in its most approved form consists in, first, nitrating the fiber by means of a bath of mixed acids; second, clarifying or filtering the spent acids which have been used to accomplish the nitration of the fiber, and, third, restoring the strength of the clarified spent acid by the addition of nitric and sulphuric acid.

In practice I take any given quantity of spent acid, enough to supply a factory for any given period. Having collected the same in an appropriate vessel an analysis is made, whereby I ascertain the quantity of nitric acid which is necessary to effect a restoration. Having arrived at a knowledge of the proportion of nitric acid that is demanded, I add such quantity of a nitrate, either metallic, earthy, or alkaline, as will accomplish the desired object. The nitrate being introduced is decomposed by the sulphuric acid present in the bath, whereby the nitric acid is liberated, and the strength of the bath affected accordingly. The decomposition of the nitrate by the sulphuric acid causes a loss of the latter, and this loss must be compensated for by the addition of a suitable quantity of fresh sulphuric acid, which may be introduced simultaneously with the nitrate or afterward.

It is essential that great care be exercised in making an accurate analysis and in adding the precise quantity of the nitrate that may be demanded, as any deficiency or excess in the quantity of nitrate supplied will result in an improperly-nitrated compound.

After the mixture has been made, as hereinbefore described, it is allowed to stand until a crystallization of the by-product takes place, which may be hastened by artificial means, if desired. When the crystallization has been effected, the liquid part of the mixture is separated by any of the well-known methods of accomplishing that result. The liquid part is then utilized in the treatment of the fiber.

It is not to be understood that the process described is limited to cases where both clarification and restoration are demanded, as there may be instances where, by reasons of the condition of the cellulose that is used, the spent acid will contain but little flocculent matter, and will not therefore require to be clarified or filtered.

What I claim as my invention, and desire to secure by Letters Patent, is—

In the art of manufacturing nitro-cellulose, the process herein described of restoring and purifying a spent bath, consisting in restoring the strength of the bath by the introduction of a suitable quantity of sulphuric acid and a nitrate, effecting the crystallization of the resulting by-product, and finally removing the by-product, substantially as set forth.

Signed at New York, in the county of New York and State of New York, this 22d day of August, A. D. 1885.

FRANK V. POOL.

Witnesses:
  GEORGE COOK,
  CHAS. C. GILL.